United States Patent
Inoue

(10) Patent No.: US 12,148,143 B2
(45) Date of Patent: Nov. 19, 2024

(54) PRODUCT-INSPECTION APPARATUS, PRODUCT-INSPECTION METHOD, AND NON-TRANSITORY COMPUTER READABLE MEDIUM

(71) Applicant: NEC Corporation, Tokyo (JP)

(72) Inventor: Keiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 453 days.

(21) Appl. No.: 17/441,384

(22) PCT Filed: Mar. 27, 2019

(86) PCT No.: PCT/JP2019/013119
§ 371 (c)(1),
(2) Date: Sep. 21, 2021

(87) PCT Pub. No.: WO2020/194567
PCT Pub. Date: Oct. 1, 2020

(65) Prior Publication Data
US 2022/0189000 A1    Jun. 16, 2022

(51) Int. Cl.
*G06T 7/00* (2017.01)
*G01N 21/88* (2006.01)
*G06V 10/98* (2022.01)

(52) U.S. Cl.
CPC ......... *G06T 7/001* (2013.01); *G01N 21/8806* (2013.01); *G06V 10/993* (2022.01);
(Continued)

(58) Field of Classification Search
CPC ........ G01N 21/8806; G01N 2021/8887; G06T 7/001; G06T 2207/30108; G06V 10/993
See application file for complete search history.

(56) References Cited

U.S. PATENT DOCUMENTS

| 5,452,080 A | 9/1995 | Tomiya |
| 6,307,210 B1 | 10/2001 | Suzuki et al. |
| (Continued) | | |

FOREIGN PATENT DOCUMENTS

| CN | 104359916 B | 4/2017 |
| JP | H05-152405 A | 6/1993 |
| (Continued) | | |

OTHER PUBLICATIONS

Mari, et al. (Computer English Translation of Japanese Patent No. JP 3793396 B2), pp. 1-4. (Year: 2006).*
(Continued)

*Primary Examiner* — Daniel G Mariam
(74) *Attorney, Agent, or Firm* — Sughrue Mion, PLLC

(57) ABSTRACT

A product-inspection apparatus capable of contributing to the improvement in the efficiency of product-inspections of objects to be inspected is provided. A product-inspection apparatus includes a mirror including a first reflection part on a side surface of a first projecting part having a tapered shape, a first imaging unit configured to take images of a plurality of objects to be inspected arranged around the first reflection part through the first reflection part, a light source configured to apply light to the objects to be inspected, and a determination unit configured to determine whether or not the object to be inspected is a quality product based on image information taken by the first imaging unit.

2 Claims, 18 Drawing Sheets

(52) U.S. Cl.
CPC ............... *G01N 2021/8887* (2013.01); *G06T 2207/30108* (2013.01)

(56) References Cited

U.S. PATENT DOCUMENTS

| | | | |
|---|---|---|---|
| 2008/0001104 A1 | 1/2008 | Voigt et al. | |
| 2010/0322504 A1 | 12/2010 | Yang | |
| 2018/0172602 A1* | 6/2018 | Beck | G01N 21/9009 |
| 2021/0190482 A1* | 6/2021 | Habermann | G01B 11/303 |

FOREIGN PATENT DOCUMENTS

| | | |
|---|---|---|
| JP | H07-098216 A | 4/1995 |
| JP | H08-304012 A | 11/1996 |
| JP | H10-148517 A | 6/1998 |
| JP | H10-227622 A | 8/1998 |
| JP | 2000-171409 A | 6/2000 |
| JP | 2000-241363 A | 9/2000 |
| JP | 2000-298103 A | 10/2000 |
| JP | 2002-092797 A | 3/2002 |
| JP | 2003-042734 A | 2/2003 |
| JP | 2006-138693 A | 6/2006 |
| JP | 2007-114187 A | 5/2007 |
| JP | 4707511 B2 | 6/2011 |
| JP | 2011-149935 A | 8/2011 |
| JP | 2016-217765 A | 12/2016 |
| JP | 2018-087116 A | 6/2018 |
| WO | 2018/172017 A1 | 9/2018 |
| WO | 2018/193609 A1 | 10/2018 |

OTHER PUBLICATIONS

Hideo, et al. (Computer English Translation of Japanese Patent No. JP2000-298103 (Year: 2000).*
Japanese Office Action for JP Application No. 2021-508522 mailed on Aug. 23, 2022 with English Translation.
Extended European Search Report for EP Application No. EP19921888.4 dated on Mar. 1, 2022.
International Search Report for PCT Application No. PCT/JP2019/013119, mailed on Apr. 23, 2019.
Japanese Office Communication for JP Application No. 2021-508522 mailed on Nov. 1, 2022 with English Translation.
Japanese Office Action for JP Application No. 2021-508522 mailed on Jun. 14, 2022 with English Translation.

* cited by examiner

PRODUCT-INSPECTION APPARATUS, PRODUCT-INSPECTION METHOD, AND NON-TRANSITORY COMPUTER READABLE MEDIUM

This application is a National Stage Entry of PCT/JP2019/013119 filed on Mar. 27, 2019, the contents of all of which are incorporated herein by reference, in their entirety.

TECHNICAL FIELD

The present disclosure relates to a product-inspection apparatus, a product-inspection method, and a non-transitory computer readable medium.

BACKGROUND ART

An ordinary product-inspection apparatus is configured to determine whether or not an object to be inspected, which is an object in which an object to be contained is contained in a container, is a quality product by determining the presence/absence of a foreign substance contained in the object to be inspected. For example, a product-inspection apparatus disclosed in Patent Literature 1 is configured to determine the presence/absence of a foreign substance contained in an object to be inspected, which is made to revolve by an inspection rotor, based on a plurality of pieces of image information that are acquired by photographing the object to be inspected while applying light to the object to be inspected by a light source disposed on one of both sides of the object to be inspected and making an imaging unit disposed on the other of both sides of the revolving object to be inspected keep track of the object to be inspected to a certain range.

CITATION LIST

Patent Literature

Patent Literature 1: Japanese Patent No. 4707511

SUMMARY OF INVENTION

Technical Problem

The product-inspection apparatus disclosed in Patent Literature 1 has a problem that since only one object to be inspected can be photographed by one imaging unit at a time, the efficiency of product-inspections of objects to be inspected is poor.

One of the objects that example embodiments disclosed in this specification are intended to achieve is to provide a product-inspection apparatus, a product-inspection method, and a non-transitory computer readable medium capable of contributing to solving the above-described problem. Note that the aforementioned object is merely one of a plurality of objects that a plurality of example embodiments disclosed in this specification are intended to achieve. Other objects or problems and novel features will be made apparent from the following description in this specification and the accompanying drawings.

Solution to Problem

A product-inspection apparatus according to a first aspect includes:
a mirror including a first reflection part disposed on a side surface of a first projecting part having a tapered shape;
a first imaging unit configured to take images of a plurality of objects to be inspected arranged around the first reflection part through the first reflection part;
a light source configured to apply light to the objects to be inspected; and
a determination unit configured to determine whether or not the object to be inspected is a quality product based on image information taken by the first imaging unit.

A product-inspection method according to a second aspect includes:
applying light to a plurality of objects to be inspected arranged around a mirror including a first reflection part disposed on a side surface of a first projecting part having a tapered shape;
taking images of the plurality of objects to be inspected through the first reflection part; and
determining whether or not the object to be inspected is a quality product based on taken image information.

A non-transitory computer readable medium according to a third aspect stores a program for causing a computer to:
apply light to a plurality of objects to be inspected arranged around a mirror including a first reflection part disposed on a side surface of a first projecting part having a tapered shape;
take images of the plurality of objects to be inspected through the first reflection part; and
determine whether or not the object to be inspected is a quality product based on acquired image information.

Advantageous Effects of Invention

According to the above-described aspects, it is possible to provide a product-inspection apparatus, a product-inspection method, and a non-transitory computer readable medium capable of contributing to the improvement in the efficiency of product-inspections of objects to be inspected.

DESCRIPTION OF EMBODIMENTS

A best mode for carrying out the present disclosure will be described hereinafter with reference to the accompanying drawings. However, the present disclosure is not limited to the below-shown example embodiments. Further, to clarify the explanation, the following description and drawings are simplified as appropriate.

First Example Embodiment

In a product-inspection apparatus and a product-inspection method according to this example embodiment, it is determined whether or not a foreign substance is contained in an object to be inspected, which is an object in which a fluid or a powder is hermetically contained in a container, and by doing so, it is determined whether or not the object to be inspected is a quality product based on the result of the aforementioned determination. The fluid is, for example, in a liquid state, a gel state, or a sol state. Further, macromolecular medicines such as oral medicines or injection medicines are suitable as the fluid. However, the fluid may be any object as long as it is optically transparent and flowable in the container.

Powder medicines such as oral medicines or injection medicines are suitable as the powder. However, the powder may be any substance as long as it is in a powdery state. The container is an optically-transparent vial, an optically transparent ampule, or an optically transparent test tube. The foreign substance is a substance different from the fluid or the powder. Examples of the foreign substance include a piece of a fiber such as a cloth, a piece of hair falling from a human body, a piece of metal such as a piece of a component in a production line for the object to be inspected or the like, and a piece of resin and a piece of glass such as a piece of a container.

Figure 1:
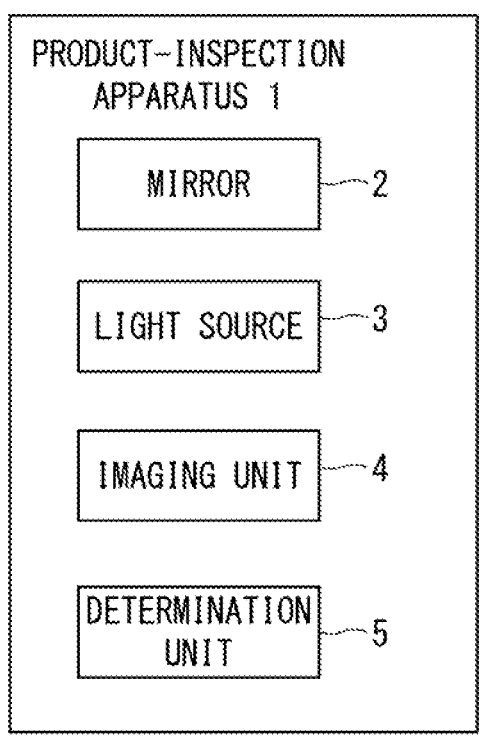
FIG. 1 is a block diagram showing a minimum configuration of a product-inspection apparatus according to a first example embodiment.

Firstly, a minimum configuration of a product-inspection apparatus according to this example embodiment will be described. FIG. 1 is a block diagram showing a minimum configuration of a product-inspection apparatus according to this example embodiment. As shown in FIG. 1, a product-inspection apparatus 1 includes a mirror 2, a light source 3, an imaging unit 4, and a determination unit 5. The mirror 2 includes a reflection part disposed on a side surface of a projecting part having a tapered shape (which will be described later in detail).

The light source 3 applies light to objects to be inspected. The imaging unit 4 takes images of a plurality of objects to be inspected arranged around the reflection part of the mirror 2 through the reflection part. The determination unit 5 determines whether or not the object to be inspected is a quality product based on the image information taken by the imaging unit 4.

Figure 2:
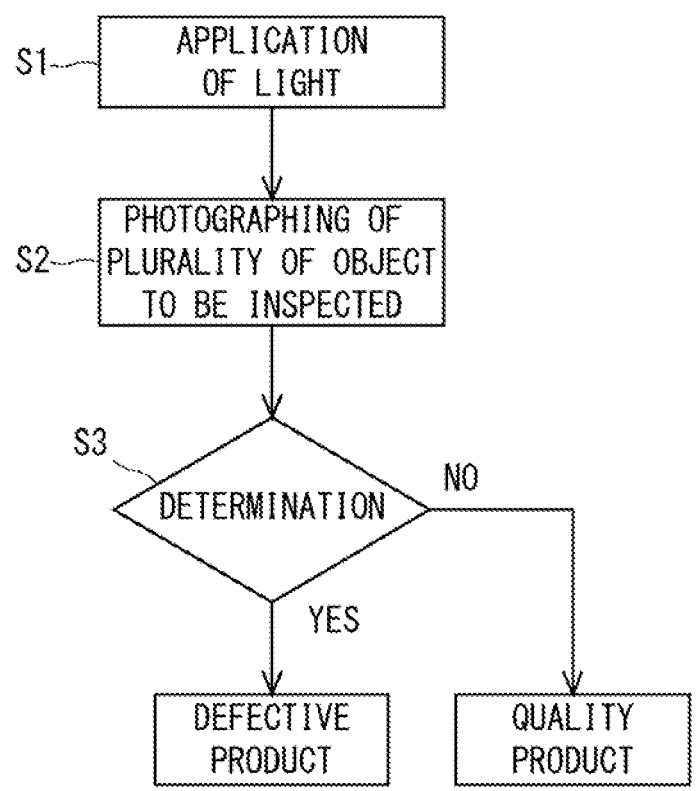
FIG. 2 is a flowchart showing a product-inspection method according to the first example embodiment.

Next, a product-inspection method using a product-inspection apparatus according to this example embodiment will be described. FIG. 2 is a flowchart showing a product-inspection method according to this example embodiment. Firstly, the light source 3 applies light to a plurality of objects to be inspected arranged around the reflection part of the mirror 2 (S1).

Then, the imaging unit 4 takes images of the plurality of objects to be inspected through the reflection part of the mirror 2 (S2). Note that, for example, in the case where the plurality of objects to be inspected revolve around the mirror 2, it is possible to successively photograph the plurality of objects to be inspected from when the plurality of objects to be inspected begin to be reflected on the reflection part of the mirror 2 to when they cease to be reflected thereon.

However, for example, even when the plurality of objects to be inspected arranged around the reflection part of the mirror 2 do not revolve around the mirror 2, it is possible to simultaneously photograph the plurality of objects to be inspected. Note that the "revolution" is not limited to the cases where an object(s) to be inspected makes one circle around the mirror 2 along a circular orbit, but also includes the cases where an object(s) to be inspected moves along only a part of the circular orbit.

Next, the determination unit 5 determines whether or not the object to be inspected is a quality product based on the acquired image information (S3). That is, the determination unit 5 determines the presence/absence of a foreign substance contained in the object to be inspected based on the acquired image information, and determines that the object to be inspected is a defective product when a foreign substance is contained in the object to be inspected (Yes in S3).

Further, the determination unit 5 determines the presence/absence of a foreign substance contained in the object to be inspected based on the acquired image information, and determines that the object to be inspected is a quality product when no foreign substance is contained in the object to be inspected (No in S3).

As described above, in the product-inspection apparatus 1 and the product-inspection method according to this example embodiment, it is possible to simultaneously photograph a plurality of objects to be inspected arranged around the reflection part of the mirror 2 through the reflection part by using one imaging unit 4, so that it is possible to contribute to the improvement in the efficiency of product-inspections of objects to be inspected.

Figure 3:
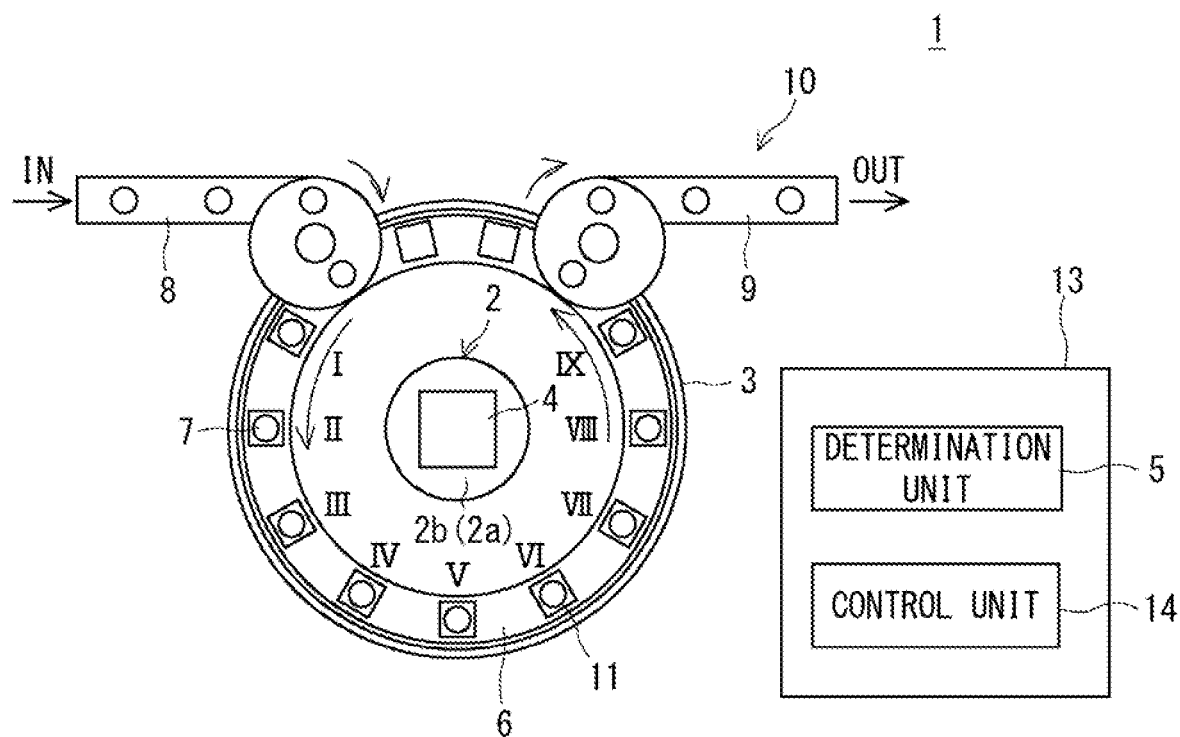
FIG. 3 shows a specific configuration of a product-inspection apparatus according to the first example embodiment.
Figure 4:
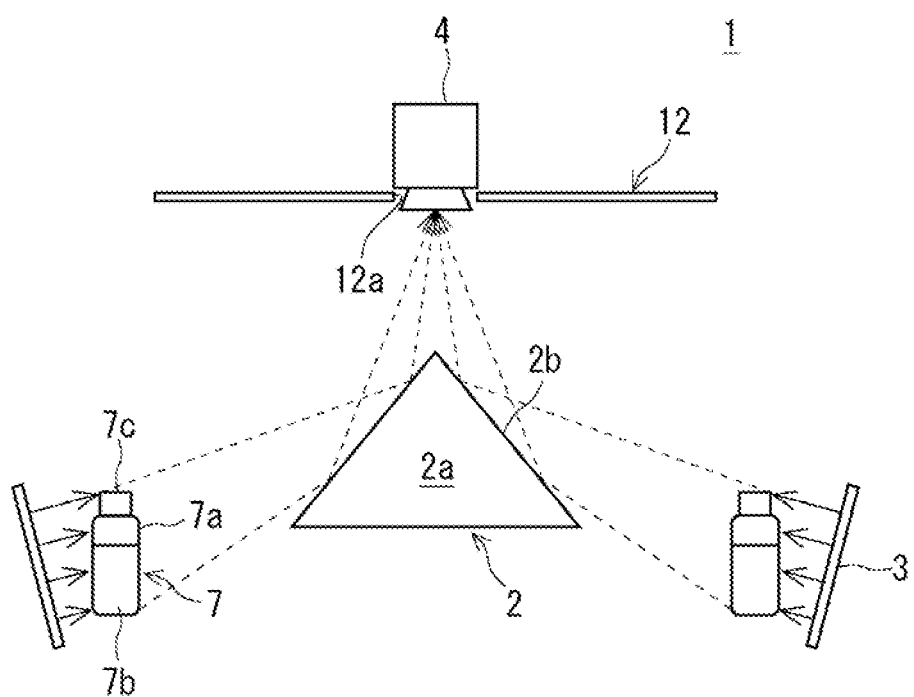
FIG. 4 is a diagram for explaining a positional relation among objects to be inspected, a light source, a mirror, and an imaging unit in a product-inspection apparatus according to the first example embodiment.

Next, a specific configuration of the product-inspection apparatus 1 according to this example embodiment will be described. FIG. 3 shows a specific configuration of a product-inspection apparatus according to this example embodiment. FIG. 4 is a diagram for explaining a positional relation among objects to be inspected, a light source, a mirror, and an imaging unit in a product-inspection apparatus according to this example embodiment. Note that the following description will be given on the assumption that the direction of gravity is defined as the downward direction.

As shown in FIGS. 3 and 4, the product-inspection apparatus 1 includes a conveyance unit 6 in addition to the above-described mirror 2, the light source 3, the imaging unit 4, and the determination unit 5. Further, the product-inspection apparatus 1 is configured to, for example, product-inspect objects to be inspected 7 which revolve around the mirror 2 by the conveyance unit 6. The above-described product-inspection apparatus 1 is suitable, for example, for product-inspecting objects to be inspected 7 each of which is sealed by a plug 7c in a state in which a fluid 7b is contained in a transparent container 7a.

The conveyance unit 6 is an annular inspection table as viewed in the up/down direction. For example, the conveyance unit 6, a product-supply unit 8, and a product-output unit 9 constitute a conveyance path 10. That is, in the conveyance path 10, after the conveyance unit 6 receives an object to be inspected 7 supplied from the product-supply unit 8 and revolves the received object to be inspected 7, the object to be inspected 7 is conveyed from the conveyance unit 6 to the product-output unit 9.

Note that the conveyance unit 6 preferably includes rotation units 11 which are arranged at roughly equal intervals in the conveyance unit 6 and each of which makes an object to be inspected 7 rotate on its own axis which coincides with a rotation axis extending in the up/down direction. Further, the conveyance unit 6 is preferably configured so that objects to be inspected 7 supplied from the product-supply unit 8 are fixed to the rotation units 11.

For example, each of the rotation units 11 makes an object to be inspected 7 rotates on its own axis for a predetermined period and abruptly stops the rotation thereof, so that the fluid 7b continues to rotate by the inertia thereof while the rotation of the container 7a is stopped. However, the rotation unit 11 may be configured so as to make the object to be inspected 7 continuously rotate on its own axis while the object to be inspected 7 is being conveyed by the conveyance unit 6.

Note that the rotation unit 11 preferably includes a grasping part for fixing the object to be inspected 7 to the rotation unit 11. However, the configuration of the rotation unit 11 is not limited to those in which an object to be inspected 7 is fixed to the rotation unit 11 by grasping the object to be inspected 7. That is, any configuration may be used as long as the object to be inspected 7 can be rotated on its own axis by means of the rotation unit 11.

The mirror 2 includes a projecting part 2a having an upwardly-tapered shape, and a side surface of the projecting part 2a serves as a reflection part 2b. As shown in FIGS. 3 and 4, for example, the projecting part 2a is formed in a conical shape projecting upward. Therefore, the reflection part 2b is formed as a reflection surface having a conical shape projecting upward. The above-described mirror 2 is disposed so that the central axis of the mirror 2 passes through roughly the center of the conveyance unit 6.

The light source 3 emits light in a wavelength range in which the fluid 7b does not change in quality. For example, in the case where the fluid 7b is a macromolecular medicine, the light source 3 preferably emits light in a wavelength range other than far-infrared rays and ultraviolet rays. Further, in the case where the container 7a is a glass vial, the light source 3 preferably emits light in a wavelength range of near-infrared rays in which the transmittance of the container 7a is high. In this case, the light source 3 preferably emits parallel light (collimated light).

The light source 3 is disposed on the side of the conveyance unit 6 opposite to the side thereof on which the mirror 2 is disposed as viewed in the up/down direction. That is, the light source 3 is disposed so that the conveyance unit 6 is disposed (i.e., interposed) between the mirror 2 and the light source 3, and is disposed, for example, along the outer circumference of the conveyance unit 6. The above-described light source 3 applies light to the objects to be inspected 7 from a place located obliquely below the objects to be inspected 7.

The imaging unit 4 includes an image sensor such as a CMOS (Complementary Metal Oxide Semiconductor) or a CCD (Charge Coupled Device), and outputs acquired image information to the determination unit 5. As shown in FIGS. 3 and 4, for example, the imaging unit 4 is disposed directly above the mirror 2.

Note that the imaging unit 4 is disposed so that the central axis of the mirror 2 passes through roughly the center of the image sensor of the imaging unit 4. Further, the imaging unit 4 is disposed so that images of the entire objects to be inspected 7 are confined in the angle of view of the imaging unit 4 through the reflection part 2b of the mirror 2. However, there is no restriction on the positional relation among the mirror 2, the light source 3, the imaging unit 4, and the objects to be inspected 7 as long as the imaging unit 4 can photograph at least parts of the objects to be inspected 7.

Note that as shown in FIG. 4, in order to prevent light reflected by the reflection part 2b of the mirror 2 from being reflected in the external environment, an antireflection part 12 is preferably disposed around the imaging unit 4. The antireflection part 12 is, for example, a black plate, and the imaging unit 4 is exposed from a through-hole 12a formed in the antireflection part 12. However, the antireflection part 12 may be any component as long as it can absorb the light reflected on the mirror 2.

The determination unit 5 determines whether or not the object to be inspected 7 is a quality product based on the image information acquired as described above, and is disposed, for example, in a processing apparatus 13 as shown in FIG. 3. The processing apparatus 13 includes a control unit 14 in addition to the determination unit 5. The control unit 14 controls the light source 3, the imaging unit 4, the conveyance path 10, the rotation units 11, and the like (which will be described later in detail).

Figure 5:
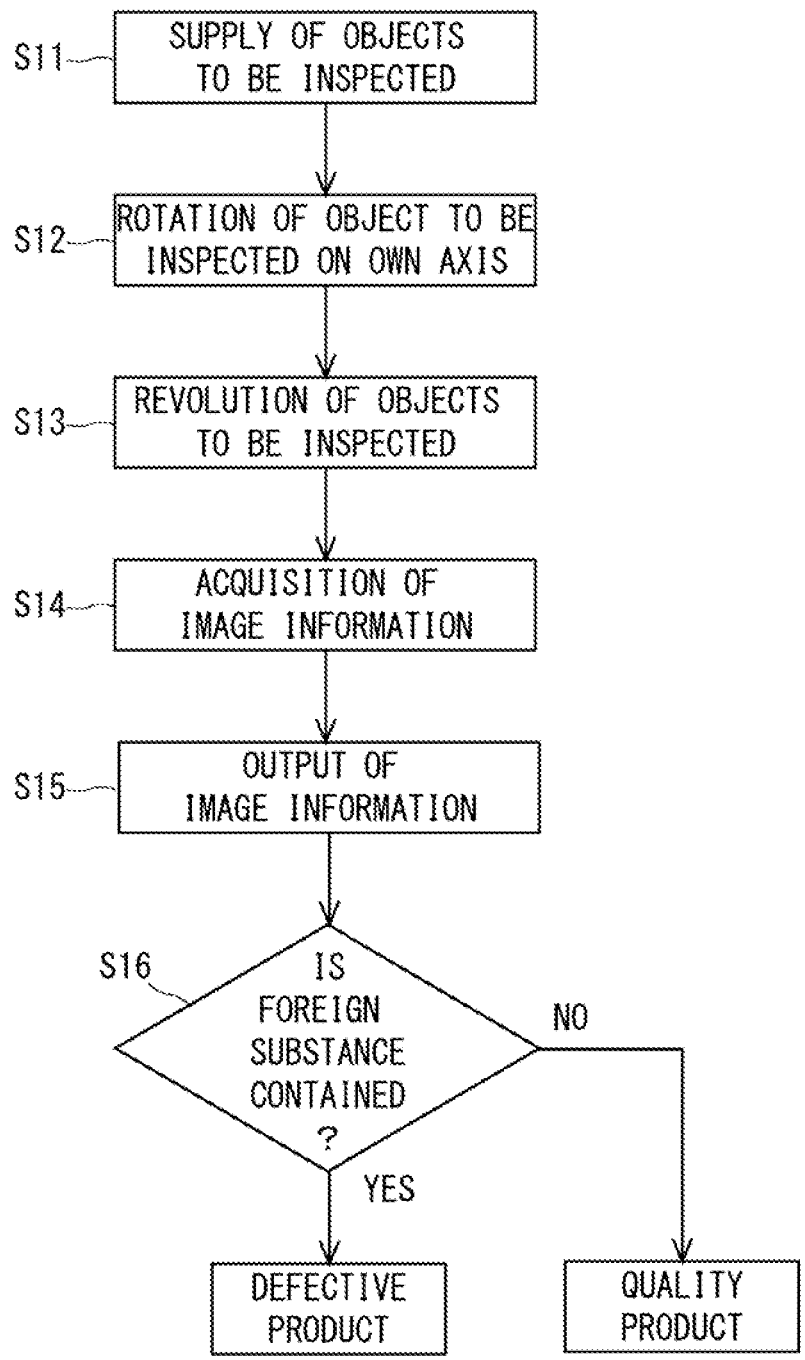
FIG. 5 is a flowchart showing a specific flow of a product-inspection method according to the first example embodiment.
Figure 6:
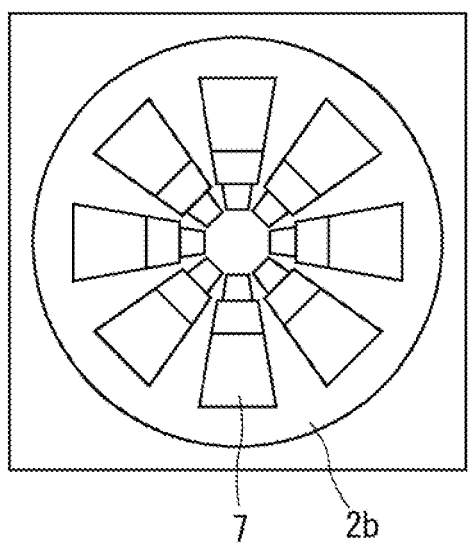
FIG. 6 shows the acquired image information.

Next, a specific flow of a product-inspection method according to this example embodiment will be described. FIG. 5 is a flowchart showing a specific flow of a product-inspection method according to this example embodiment. FIG. 6 shows acquired image information. Note that, in the following description, it is assumed that a plurality of objects to be inspected 7 have already been supplied in the conveyance unit 6, and the below-described operation is started from a state immediately after an object to be inspected 7 disposed closest to the product-output unit 9 has just been moved out from the conveyance unit 6.

Firstly, the control unit 14 controls the conveyance path 10 so as to supply an object to be inspected 7 from the product-supply unit 8 to the conveyance unit 6, and fix the object to be inspected 7 supplied to the conveyance unit 6 to the rotation unit 11 (S11). Note that, for example, the object to be inspected 7 is fixed to the rotation unit 11 in a standing position (i.e., in a state in which the lower surface of the object to be inspected 7 is disposed in a roughly horizontal direction). Note that the plurality of objects to be inspected 7 do not necessarily have to be disposed on the sides of the reflection part 2b of the mirror 2. That is, the objects to be inspected 7 may be disposed in any places as long as they are arranged around the reflection part 2b of the mirror 2 as viewed in the up/down direction.

Next, the control unit 14 controls the rotation unit 11 so as to make the object to be inspected 7 rotate on its own axis for a predetermined period and abruptly stops the rotation thereof, so that the fluid 7b continues to rotate by the inertia thereof (S12). In this way, it is possible to make bubbles in the fluid 7b disappear by the vortex of the fluid 7b. Further, it is possible to make a foreign substance(s) rise by the vortex of the fluid 7b.

Next, after finishing the rotation of the object to be inspected 7 on its own axis, the control unit 14 controls the conveyance path 10 so as to rotate the conveyance unit 6, and revolves the plurality of objects to be inspected 7 so that each of the plurality of objects to be inspected 7 is disposed at a predetermined position (S13).

Next, the control unit 14 controls the imaging unit 4, and thereby makes the imaging unit 4 photograph the object to be inspected 7, which has reached the predetermined position in the conveyance unit 6, through the reflection part 2b of the mirror 2 and acquire image information thereof, while controlling the light source 3 so as to apply light to the object to be inspected 7 (S14).

Note that the light source 3 may apply light so that the application of light is synchronized with the shooting timing of the imaging unit 4, or may continuously apply light to the plurality of objects to be inspected 7. That is, there is no restriction on how to apply light to the plurality of objects to be inspected 7 as long as they are irradiated with light at the shooting timing of the imaging unit 4.

Note that since the reflection part 2b of the mirror 2 has a conical shape, images of the plurality of objects to be inspected 7 reflected on the reflection part 2b are guided to the imaging unit 4 disposed above the reflection part 2b, so that the imaging unit 4 acquires image information in which the plurality of objects to be inspected 7 are radially arranged as shown in FIG. 6.

Note that regarding the images of the objects to be inspected 7 that have been reflected on the reflection part 2b and guided to the imaging unit 4, the more they are away from the center of the reflection part 2b, the more they are expanded. As a result, the imaging unit 4 can acquire image information in which the lower parts of the objects to be inspected 7 are enlarged.

Further, when the antireflection part 12 is disposed around the imaging unit 4, it is possible to prevent light reflected by the reflection part 2b of the mirror 2 from being reflected in the external environment and from entering the imaging unit 4, and thereby to acquire image information containing little noises.

Next, the control unit 14 controls the imaging unit 4 and thereby makes the imaging unit 4 output the acquired image information to the determination unit 5 (S15). By repeating the above-described steps S11 to S15, it is possible to acquire, in a chronological order, a plurality of pieces of image information that are obtained by photographing the objects to be inspected 7, which are successively supplied to the conveyance unit 6, at the predetermined positions.

Next, when an object to be inspected 7 supplied to the conveyance unit 6 is disposed at the position closest to the product-output unit 9, the determination unit 5 creates moving-image information of that object to be inspected 7 based on the plurality of pieces of image information, and determines the presence/absence of a foreign substance contained in the object to be inspected 7 based on the created moving-image information (S16).

Specifically, for example, in the case where image information in a state where a plurality of objects to be inspected 7 are arranged at positions I to IX shown in FIG. 3 is acquired, the determination unit 5 creates moving-image information by arranging (i.e., sorting) pieces of image information that was obtained by photographing an object to be inspected 7 at the position I, image information that was obtained by photographing that object to be inspected 7 at the position II, image information that was obtained by photographing that object to be inspected 7 at the position III, image information that was obtained by photographing that object to be inspected 7 at the position IV, image information that was obtained by photographing that object to be inspected 7 at the position V, image information that was obtained by photographing that object to be inspected 7 at the position VI, image information that was obtained by photographing that object to be inspected 7 at the position VII, image information that was obtained by photographing that object to be inspected 7 at the position VIII, and image information that was obtained by photographing that object to be inspected 7 at the position IX in a chronological order.

Note that the positions I to IX (e.g., angular positions around the center of the imaging unit 4 as viewed from above) in the conveyance unit 6 are known. Therefore, the moving-image information of an object to be inspected 7 for which moving-image information is to be created is preferably created by extracting a part where that object to be inspected 7 is shown from each of the pieces of image information based on the information about the positions I to IX, and making a correction in regard to the inclination of each of the extracted pieces of image information.

Then, the determination unit 5 compares the pixel values of pixels adjacent to each other in the first piece of image information among the plurality of pieces of image information in the moving-image information, defines pixels having pixel values of which differences from those of pixels adjacent to them are equal to or larger than a predetermined threshold as a boundary with the fluid 7b, and labels a group of pixels surrounded by these pixels. Note that the predetermined threshold has an absolute value.

Further, the determination unit 5 recognizes the moving direction of the group of labeled pixels by keeping track of the group of pixels based on the moving-image information. Then, for example, when there is a group of pixels that behaves differently from a predetermined movement of a bubble, the determination unit 5 determines that a foreign substance is contained in the object to be inspected 7.

On the other hand, for example, when there is no group of pixels that behaves differently from the predetermined movement of a bubble, the determination unit 5 determines that no foreign substance is contained in the object to be inspected 7. Note that an ordinary foreign-substance detection method can be used as a method for detecting a foreign substance.

Note that the imaging unit 4 preferably photographs the objects to be inspected 7 at such a frame rate that the tracking of a group of pixels can be performed without becoming un-trackable due to the sudden movement of the group of pixels in the moving-image information. For example, the frame rate of the imaging unit 4 is set as appropriate according to the viscosity of the fluid 7b so that the moving distance of a group of pixels per frame is equal to or shorter than one pixel.

When it is determined that a foreign substance is contained in the object to be inspected 7 (Yes in S16), the determination unit 5 determines that the object to be inspected 7 is a defective product and outputs the result of the determination to the control unit 14. The control unit 14 removes the object to be inspected 7 from the conveyance path 10, for example, by controlling a robot arm (not shown).

On the other hand, when it is determined that no foreign substance contained in the object to be inspected 7 (No in S16), the determination unit 5 determines that the object to be inspected 7 is a quality product and outputs the result of the determination to the control unit 14. The control unit 14 controls the conveyance path 10 so as to moves out the object to be inspected 7 from the conveyance unit 6 to the product-output unit 9. After that, the control unit 14 returns to the step S11 and controls the conveyance path 10 so as to convey a new object to be inspected 7 to the conveyance unit 6.

As described above, in the product-inspection apparatus 1 and the product-inspection method according to this example embodiment, it is possible to successively photograph a plurality of objects to be inspected 7 arranged around the reflection part 2b of the mirror 2 through the reflection part 2b in a chronological order by using one imaging unit 4. Therefore, the amount of information that can be acquired by one imaging unit 4 is larger, so that it is possible to contribute to the improvement in the efficiency of product-inspections of objects to be inspected 7.

In addition, in this example embodiment, it is possible to acquire image information in which the lower parts of objects to be inspected 7 are enlarged. Therefore, it is possible to accurately detect a foreign substance that moves downward in the fluid 7b. As a result, it is possible to improve the accuracy of the detection of a foreign substance contained in an object to be inspected 7.

Note that although objects to be inspected 7 in each of which a fluid 7b is contained in a transparent container 7a are product-inspected in this example embodiment, objects to be inspected in each of which a powder is contained in a transparent container may be product-inspected. In this case, the light source 3 is disposed so as to be able to apply light to a surface of the powder.

Second Example Embodiment

In the first example embodiment, images of a plurality of objects to be inspected 7 are guided to the imaging unit 4 disposed above the mirror 2 through the mirror 2. However, images of a plurality of objects to be inspected may be guided to an imaging unit disposed below a mirror through the mirror.

Figure 7:
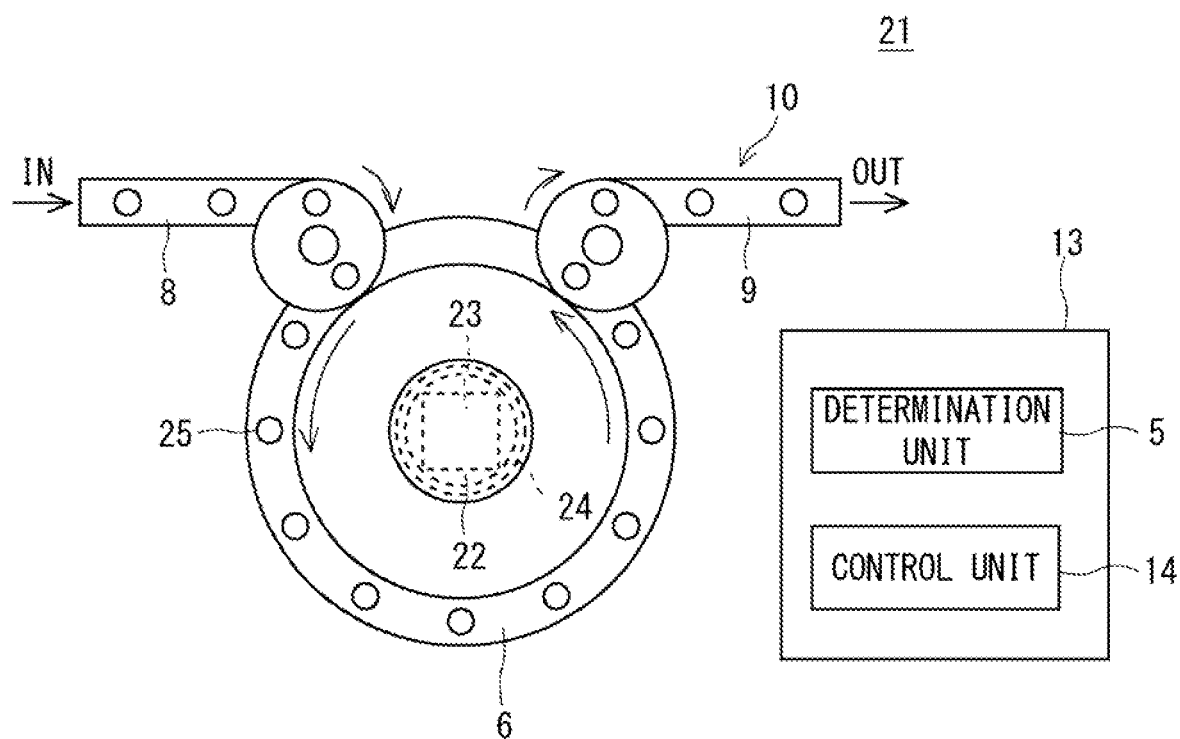
FIG. 7 shows a specific configuration of a product-inspection apparatus according to a second example embodiment.
Figure 8:
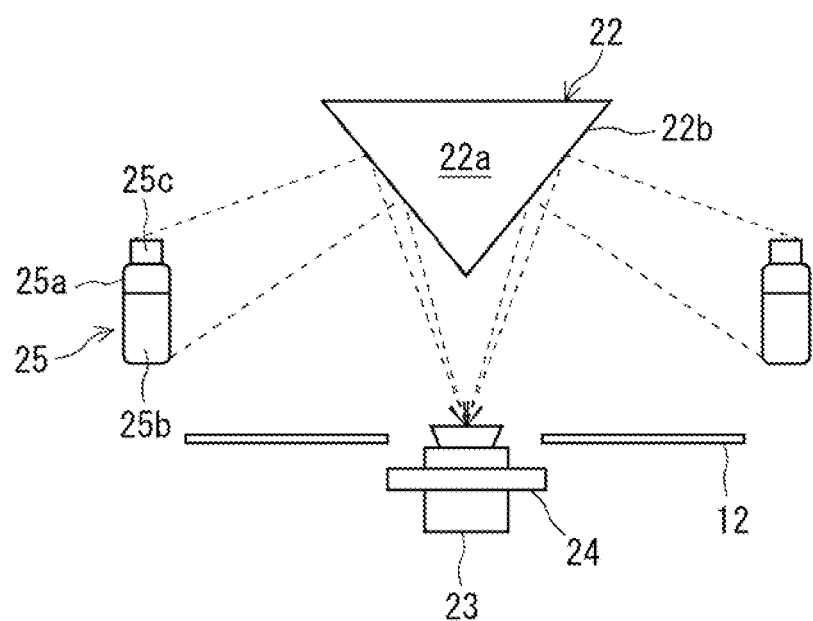
FIG. 8 is a diagram for explaining a positional relation among objects to be inspected, a light source, a mirror, and an imaging unit in the second example embodiment.

Here, FIG. 7 shows a specific configuration of a product-inspection apparatus according to an example embodiment. FIG. 8 is a diagram for explaining a positional relation among objects to be inspected, a light source, a mirror, and an imaging unit in this example embodiment. Note that, in the following explanation, descriptions redundant to those of the first example embodiment are omitted, and the description is given while using the same reference numerals (or symbols) for equivalent elements.

A product-inspection apparatus 21 according to this example embodiment has a configuration roughly equivalent to that of the product-inspection apparatus 1 according to the first example embodiment. However, as shown in FIG. 7 and FIG. 8, the product-inspection apparatus 21 is configured so that images of a plurality of objects to be inspected 25, which are irradiated with light by a light source 24, are guided to an imaging unit 23 disposed below a mirror 22 through the mirror 22.

The above-described product-inspection apparatus 21 is suitable, for example, for inspecting objects to be inspected 25 each of which is sealed by a plug 25c in a state in which a powder 25b is contained in a transparent container 25a. It should be noted when an object to be inspected 25 in which a powder 25b is contained in a container 25a is inspected, the rotation unit 11 of the conveyance unit 6 may be omitted and the object to be inspected 25 may be fixed to the conveyance unit 6 itself. Alternatively, the product-inspection apparatus 21 may have such a configuration that an object to be inspected 25 is made to continuously rotate on its own axis by the rotation unit 11 while the object to be inspected 25 is being conveyed by the conveyance unit 6.

Specifically, as shown in FIG. 8, the mirror 22 includes a projecting part 22a having a downwardly-tapered shape, and a side surface of this projecting part 22a serves as a reflection part 22b. The projecting part 22a is formed, for example, in a conical shape projecting downward. Therefore, the reflection part 22b is formed as a reflection surface having a conical shape projecting downward. The above-described mirror 22 is disposed so that the central axis of the mirror 22 passes through roughly the center of the conveyance unit 6.

As shown in FIGS. 7 and 8, the imaging unit 23 is disposed, for example, directly below the mirror 22. Note that the imaging unit 23 is disposed so that the central axis of the mirror 22 passes through roughly the center of the image sensor of the imaging unit 23.

Further, the imaging unit 23 is disposed so that images of the entire objects to be inspected 25 are confined in the angle of view of the imaging unit 23 through the reflection part 22b of the mirror 22. However, there is no restriction on the positional relation among the mirror 22, the imaging unit 23, the light source 24, and the objects to be inspected 25 as long as the imaging unit 23 can photograph at least parts of the objects to be inspected 25.

The light source 24 is disposed so as to be able to apply light to at least a part of the part of the powder 25b that is reflected on the reflection part 22b of the mirror 22. For example, the light source 24 preferably includes a ring light that is disposed so as to surround the imaging unit 23, and preferably applies light to roughly the entire area on the upper surface of the powder 25b through the reflection part 22b of the mirror 22.

However, the light source 24 is not limited to the ring light, and may be a coaxial light, a dome light, or the like as long as it can apply light to at least a part of the part of the powder 25b that is reflected on the reflection part 22b of the mirror 22.

Even when a plurality of objects to be inspected 25 are photographed by using the above-described product-inspection apparatus 21, the imaging unit 23 can acquire image information in which the plurality of objects to be inspected 25 are radially arranged. Note that regarding the images of the objects to be inspected 25 reflected by the reflection part 22b and guided to the imaging unit 23, the more they are away from the center of the reflection part 22b, the more they are expanded. As a result, the imaging unit 23 can acquire image information in which the upper parts of the objects to be inspected 25 are enlarged. Therefore, when the object to be inspected 25 is inspected by using the product-inspection apparatus 21 according to this example embodiment, it is possible to detect, for example, a foreign substance that is exposed on the upper surface of the powder 25b.

Note that although objects to be inspected 25 in each of which a powder 25b is contained in a transparent container 25a are product-inspected in this example embodiment, object to be inspected 7 in each of which a fluid 7b is contained in a transparent container 7a may be product-inspected. In this case, the light source 24 is disposed so that light that has passed through the object to be inspected 7 is guided to the reflection part 22b of the mirror 22.

Third Example Embodiment

Figure 9:
FIG. 9 is a diagram for explaining a positional relation among objects to be inspected, a light source, a mirror, and an imaging unit in a product-inspection apparatus according to a third example embodiment.
Figure 9:
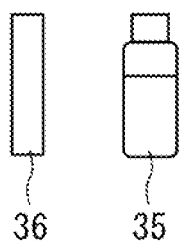
Figure 9:
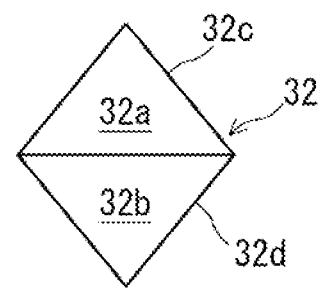
Figure 9:

The mirrors 2 and 22 according to the first and second example embodiments, respectively, project upward and downward, respectively. However, each of them may project both upward and downward. FIG. 9 is a diagram for explaining a positional relation among objects to be inspected, a light source, a mirror, and an imaging unit in a product-inspection apparatus according to this example embodiment. Note that, in the following explanation, descriptions redundant to those of the first example embodiment and the like are omitted, and the description is given while using the same reference numerals (or symbols) for equivalent elements.

A product-inspection apparatus 31 according to this example embodiment has a configuration roughly equivalent to that of the product-inspection apparatus 1 according to the first example embodiment. However, as shown in FIG. 9, a mirror 32 includes a first projecting part 32a projecting upward and a second projecting part 32b projecting downward.

The first projecting part 32a is formed, for example, in a conical shape projecting upward, and a side surface of the first projecting part 32a serves as a first reflection part 32c. The second projecting part 32b is formed, for example, in a conical shape projecting downward, and a side surface of the second projecting part 32b serves as a second reflection part 32d. The above-described first and second projecting parts 32a and 32b are symmetrically arranged with respect to a horizontal plane.

Further, a first imaging unit 33 disposed directly above the mirror 32 and a second imaging unit 34 disposed directly below the mirror 32 are arranged in the product-inspection apparatus 31. Note that the first and second imaging units 33 and 34 are arranged so that the central axis of the mirror 32 passes through roughly the centers of the image sensors of the first and second imaging units 33 and 34.

Further, the first imaging unit 33 is disposed so that images of the roughly upper halves of the objects to be inspected 35 reflected by the first reflection part 32c of the mirror 32 are confined in the angle of view of the first imaging unit 33. Further, the second imaging unit 34 is disposed so that images of the roughly lower halves of the objects to be inspected 35 reflected by the second reflection part 32d of the mirror 32 are confined in the angle of view of the second imaging unit 34.

These first and second imaging units 33 and 34 are controlled by the control unit 14 so that their shooting timings are synchronized with each other. Note that the mirror 32 and the object to be inspected 35 preferably have such a positional relation therebetween that the objects to be inspected 35 are reflected neither on the upper end part of the first projecting part 32a nor on the lower end part of the second projecting part 32b.

Even when a plurality of objects to be inspected 35 are photographed by using the above-described product-inspection apparatus 31, the first imaging unit 33 can acquire image information in which roughly the upper halves of the plurality of objects to be inspected 35 are radially arranged. Meanwhile, the second imaging unit 34 can acquire image information in which roughly the lower halves of the plurality of objects to be inspected 35 are radially arranged.

Note that, for example, the determination unit 5 acquire image information of a plurality of objects to be inspected 35 in which the upper and lower halves of them are integrated with each other by combining pieces of image information that are obtained as the first and second imaging units 33 and 34 photograph them in a synchronized manner. Then, the determination unit 5 determines the presence/absence of a foreign substance contained in the object to be inspected 35 based on the image information in which the upper and lower halves are integrated with each other.

However, the determination unit 5 may determine the presence/absence of a foreign substance contained in the object to be inspected 35 based on each of pieces of image information acquired by the first and second imaging units 33 and 34, respectively, without integrating the upper and lower halves of the pieces of image information acquired by the first and second imaging units 33 and 34 with each other.

As described above, the upper halves of the objects to be inspected 35 are photographed through the first reflection part 32c and the lower halves of the objects to be inspected 35 are photographed through the second reflection part 32d. Therefore, it is possible to improve the resolution on the side in the acquired image information where the object to be inspected is tapered in the image information as compared to the case where the entire object to be inspected 7 or 25 is photographed through one reflection part 2b or 22b as in the case of the first and second example embodiments.

In particular, when the mirror 32 and the object to be inspected 35 have such a positional relation therebetween that the object to be inspected 35 is reflected neither on the upper end part of the first projecting part 32a nor on the lower end part of the second projecting part 32a, the resolution on the side in the acquired image information where the object to be inspected is tapered in the image information can be further improved.

It should be noted that in the above-described product-inspection apparatus 31, light is also applied to the objects to be inspected 35 by the light source 36. However, in the case of the objects to be inspected 35 in each of which a fluid is contained in the container, the light source 36 is preferably disposed so that its light passes through the objects to be inspected 35. Further, in the case of the objects to be inspected 35 in each of which a powder is contained in the container, the light source 36 is preferably disposed so that its light is applied to at least parts of surfaces of the objects to be inspected 35.

Fourth Example Embodiment

Figure 10:
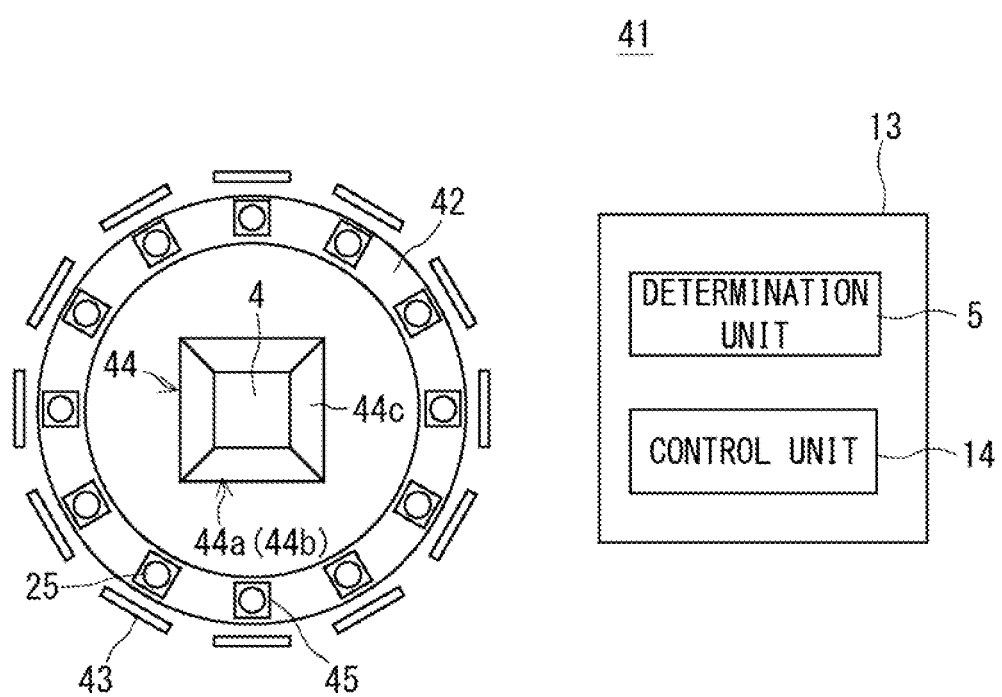
FIG. 10 shows a specific configuration of a product-inspection apparatus according to a fourth example embodiment.

Although the conveyance unit 6 of each of the product-inspection apparatuses 1, 21 and 31 according to the first to third example embodiments constitutes a part of the conveyance path 10, it may be provided independently of the conveyance path 10. FIG. 10 shows a specific configuration of a product-inspection apparatus according to this example embodiment. Note that, in the following explanation, descriptions redundant to those of the first example embodiment and the like are omitted, and the description is given while using the same reference numerals (or symbols) for equivalent elements.

A product-inspection apparatus 41 according to this example embodiment is suitable, for example, for inspecting objects to be inspected 25 each of which is sealed by a plug 25c in a state in which a powder 25b is contained in a transparent container 25a. As shown in FIG. 10, although the product-inspection apparatus 41 has a configuration roughly equivalent to that of the product-inspection apparatus 1 according to the first example embodiment, a conveyance unit 42, a light source 43, and a mirror 44 of the product-inspection apparatus 41 differ from those of the product-inspection apparatus 1.

As described above, the conveyance unit 42 is formed independently of the conveyance path 10 for objects to be inspected 25. Further, the conveyance unit 42 includes vibration units 45 arranged at roughly equal intervals, and is preferably configured so that, for example, a plurality of objects to be inspected 25 supplied by a robot arm or the like are fixed to the vibration units 45.

Each of the vibration units 45 vibrates a respective one of objects to be inspected 25 in the up/down direction or in the horizontal direction. The above-described conveyance unit 42 revolves a plurality of object to be inspected 25 so that the plurality of objects 25 are arranged at predetermined positions.

The light source 43 is disposed near the predetermined positions of the plurality of objects to be inspected 25 so as to be able to apply light to, for example, roughly the entire area on the upper surface of the powder 25*b* of each of the plurality of objects to be inspected 25 in a state in which the objects to be inspected 25 are arranged at the predetermined positions. However, the light source 43 may be disposed at any place as long as it can apply light to at least a part of the part of a one or a plurality of objects to be inspected 25 that is reflected on the reflection part 44*b* of the mirror 44.

The mirror 44 includes a projecting part 44*a* having an upwardly-tapered shape, and a side surface of the projecting part 44*a* serves as a reflection part 44*b*. As shown in FIG. 10, for example, the projecting part 44*a* is formed in a quadrangular pyramid shape projecting upward, and as a result, the reflection part 44*b* includes four triangular reflection surfaces 44*c*. The above-described mirror 44 is disposed so that the central axis of the mirror 44 passes through roughly the center of the conveyance unit 42.

Figure 11:
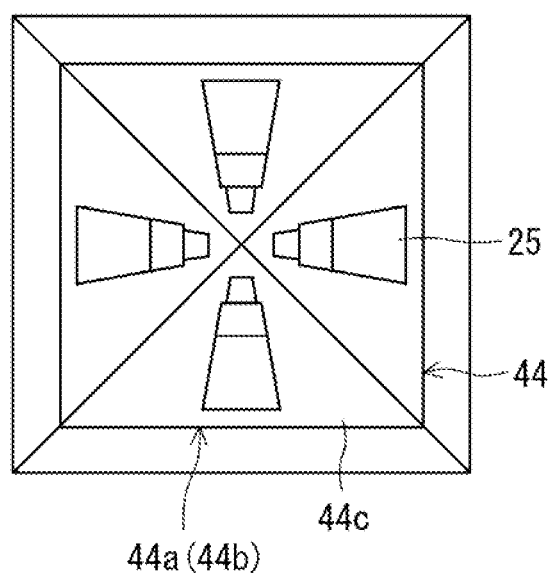
FIG. 11 shows acquired image information.

Next, a specific flow of a product-inspection method according to this example embodiment will be described. FIG. 11 shows acquired image information. Firstly, the control unit 14 controls the conveyance unit 42 so as to fix a plurality of objects to be inspected 25 conveyed by a robot arm or the like to the vibration units 45.

Next, the control unit 14, while vibrating the objects to be inspected 25 for a predetermined period by controlling the object to be inspected 45 and applying light to the objects to be inspected 25 by controlling the light source 43, controls the imaging unit 4 and thereby makes the imaging unit 4 photograph a state in which the plurality of objects to be inspected 25 are vibrating through the reflection part 44*b* of the mirror 44. Note that the imaging unit 4 successively acquires pieces of image information for the predetermined period.

Note that since the reflection part 44*b* has the four reflection surfaces 44*c*, as shown in FIG. 11, it is possible to acquire pieces of image information in each of which, among the plurality of objects to be inspected 25, four objects to be inspected 25 each of which is opposed to one of the reflection surfaces 44*c* are shown.

Next, the determination unit 5 determines the presence/absence of a foreign substance contained in the objects to be inspected 25 based on the acquired image information. After that, the control unit 14 revolves the objects to be inspected 25 by controlling the conveyance unit 42 so that the plurality of objects to be inspected 25 are arranged at predetermined positions in such a manner that the objects to be inspected 25 adjacent to those which have been just product-inspected are reflected on the reflection surfaces 44*c*. Then, the control unit 14 repeats the above-described steps. Then, when the product-inspections of all the objects to be inspected 25 are finished, the plurality of objects to be inspected 25 are moved out by a robot arm or the like.

When the objects to be inspected 25 are product-inspected by using the above-described product-inspection apparatus 41, it is possible to satisfactorily vibrate the object to be inspected 25 at the predetermined positions. Therefore, for example, it is possible to detect a foreign substance submerged in the powder 25*b* by exposing it on the upper surface of the powder 25*b* by the vibration.

It should be noted that although objects to be inspected 25 in each of which a powder 25*b* is contained in the container are product-inspected in this example embodiment, objects to be inspected 7 in each of which a fluid 7*b* is contained in the container may be product-inspected. In this case, the conveyance unit 42 preferably includes rotation units 11 instead of the vibration units 45. Further, the light source 43 is preferably disposed so that light that has passed through the object to be inspected 7 is guided to the imaging unit 4.

Fifth Example Embodiment

Figure 12:
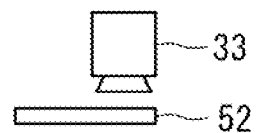
FIG. 12 is a diagram for explaining a positional relation among objects to be inspected, a light source, a mirror, an imaging unit, a first wavelength changing unit, and a second wavelength changing unit in a product-inspection apparatus according to a fifth example embodiment.
Figure 12:
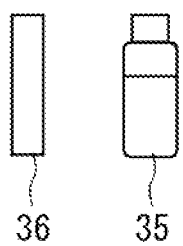
Figure 12:
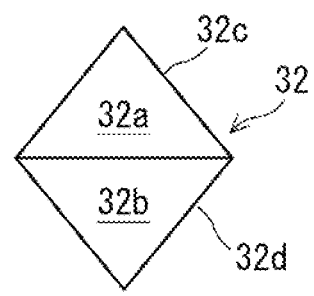
Figure 12:
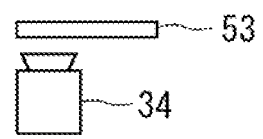

FIG. 12 is a diagram for explaining a positional relation among objects to be inspected, a light source, a mirror, an imaging unit, a first wavelength changing unit, and a second wavelength changing unit in a product-inspection apparatus according to this example embodiment. Note that, in the following explanation, descriptions redundant to those of the first example embodiment and the like are omitted, and the description is given while using the same reference numerals (or symbols) for equivalent elements.

A product-inspection apparatus 51 according to this example embodiment has a configuration roughly equivalent to that of the product-inspection apparatus 31 according to the third example embodiment. However, the product-inspection apparatus 51 includes a first wavelength changing unit 52 disposed between the first reflection part 32*c* of the mirror 32 and the first imaging unit 33, and a second wavelength changing unit 53 disposed between the second reflection part 32*d* of the mirror 32 and the second imaging unit 34. Note that the light source 36 in this example embodiment emits, for example, white light.

The first wavelength changing unit 52 changes the wavelength characteristic of light that enters the first imaging unit 33. The first wavelength changing unit 52 has, for example, a disk-like shape and includes a plurality of fan-shaped areas around the center of the first wavelength changing unit 52. Further, each of the fan-shaped areas is formed by, for example, a color filter having a different color so that the wavelength characteristic of the light can be changed to a different wavelength characteristic.

Note that at least one of the fan-shaped areas may be formed by a bandpass filter. That is, the first wavelength changing unit 52 may be any component as long as it can change the wavelength characteristic of the light that enters the first imaging unit 33 into a plurality of types of wavelength characteristics. Since the second wavelength changing unit 53 has a configuration equivalent to that of the first wavelength changing unit 52, the redundant description thereof will be omitted.

The rotations of these first and second wavelength changing units 52 and 53 are controlled by the control unit 14 so that they are synchronized with each other and the wavelength characteristics of the lights that enter the first and second imaging units 33 and 34 are changed equally to each other.

Note that, for example, every time the first and second imaging units 33 and 34 acquire pieces of image information (i.e., on a frame-by-frame basis), the control unit 14 rotates the first and second wavelength changing units 52 and 53 and thereby changes the wavelength characteristics of the lights that enter the first and second imaging units 33 and 34.

The determination unit 5 creates moving-image information by arranging (i.e., sorting), in a chronological order, pieces of image information which are obtained by obtaining a piece of image information every time the wavelength characteristics of the lights that enter the first and second imaging units 33 and 34 are equally changed, and determines the presence/absence of a foreign substance contained in the object to be inspected 35 based on the created moving-image information.

As described above, the product-inspection apparatus 51 according to this example embodiment can acquire image information while changing the wavelength characteristics of the lights that enter the first and second imaging units 33 and 34. Therefore, in the case where a plurality of types of foreign substances contained in the object to be inspected 35 can be expected in advance, it is possible to product-inspect the object to be inspected 35 while changing the wavelength characteristic, for each of the types of foreign substances, to one with which that type of a foreign substance can be easily detected. Therefore, it is possible to improve the detection of a foreign substance contained in an object to be inspected 35.

Note that there is no restriction on the wavelength changing unit as long as it is disposed between the reflection part of the mirror and the imaging unit, and the wavelength changing unit can also be used in each of the product-inspection apparatuses 1, 21 and 31 according to the first to third example embodiments.

Sixth Example Embodiment

Figure 13:
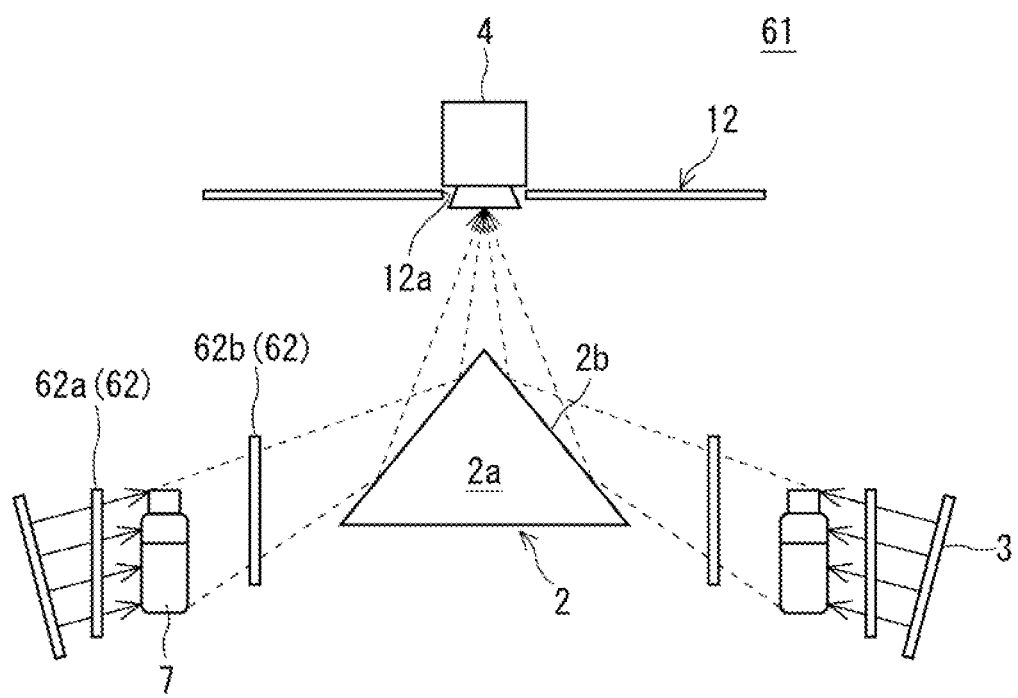
FIG. 13 is a diagram for explaining a positional relation among objects to be inspected, a light source, a mirror, an imaging unit, and polarization units in a product-inspection apparatus according to a sixth example embodiment.

FIG. 13 is a diagram for explaining a positional relation among objects to be inspected, a light source, a mirror, an imaging unit, and a polarization unit in a product-inspection apparatus according to this example embodiment. Note that, in the following explanation, descriptions redundant to those of the first example embodiment and the like are omitted, and the description is given while using the same reference numerals (or symbols) for equivalent elements.

A product-inspection apparatus 61 according to this example embodiment has a configuration roughly equivalent to that of the product-inspection apparatus 1 according to the first example embodiment. However, the product-inspection apparatus 61 includes a polarization unit 62 that polarizes light emitted from the light source 3. The polarization unit 62 includes a first polarizing plate(s) 62a disposed between the light source 3 and the objects to be inspected 7, and a second polarizing plate(s) 62b disposed between the objects to be inspected 7 and the reflection part 2b of the mirror 2. Further, the polarization unit 62 is configured so that the polarization axis can be changed by changing the orientations of the first and second polarizing plates 62a and 62b.

By being equipped with the above-described polarization unit 62, it is possible, for example, to reduce noises caused by the reflection of the container 7a of the object to be inspected 7.

Other Example Embodiment

Note that although the present invention is described as a hardware configuration in the above-described first to sixth example embodiments, the present invention is not limited to the hardware configurations. In the present invention, the processes in each of the components can also be implemented by having a CPU Central Processing Unit execute a computer program.

Figure 14:
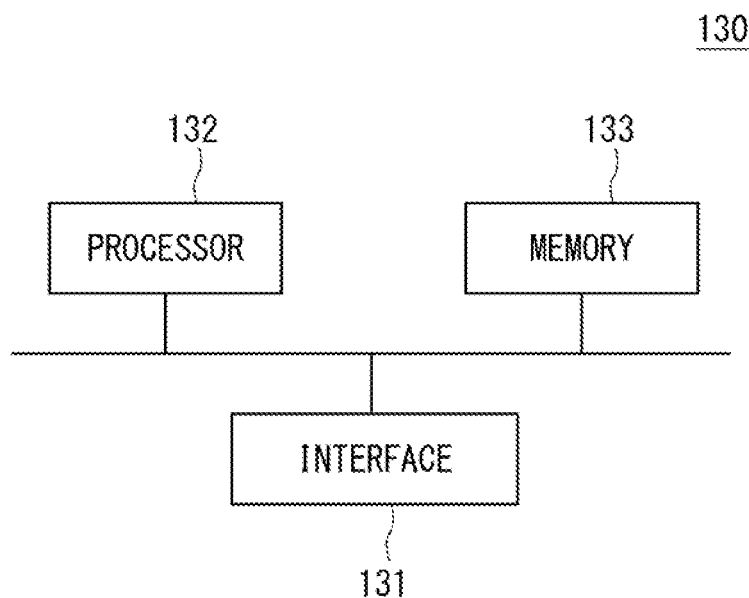
FIG. 14 shows an example of a hardware configuration included in a processing apparatus.

For example, the processing apparatus 13 according to any of the above-described example embodiments can have the below-shown hardware configuration. FIG. 14 shows an example of a hardware configuration included in the processing apparatus.

An apparatus 130 shown in FIG. 14 includes a processor 132 and a memory 133 as well as an interface 131. The processing apparatus 13 described in the above example embodiments is implemented as the processor 132 loads and executes a program stored in the memory 133. That is, this program is a program for causing the processor 132 to function as the processing apparatus 13 shown in FIG. 3.

The above-described program may be stored by using various types of non-transitory computer readable media and supplied to a computer (including the information notification apparatus). Non-transitory computer readable media include various types of tangible storage media. Examples of the non-transitory computer readable media include magnetic recording media e.g., a flexible disk, a magnetic tape, and a hard disk drive, and magneto-optical recording media e.g., a magneto-optical disk. Further, the example includes a CD-ROM Read Only Memory, a CD-R, and a CD-R/W. Further, the example includes a semiconductor memory e.g., a mask ROM, a PROM, an EPROM, a flash ROM, and a RAM. Further, the program may be supplied to a computer by various types of transitory computer readable media. Examples of the transitory computer readable media include an electrical signal, an optical signal, and electromagnetic waves. Transitory computer readable media can provide the program to a computer via a wired communication line e.g., electric wires, and optical fibers or a wireless communication line.

Note that the present disclosure is not limited to the above-described example embodiments, and they may be modified as desired without departing from the scope and spirit of the disclosure. Further, the present disclosure may be implemented by combining the above-described example embodiments with one another as desired.

Figure 15:
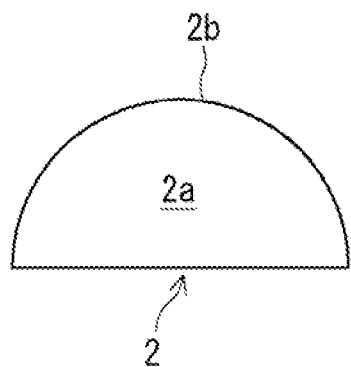
FIG. 15 shows a different reflection part of a mirror.
Figure 16:
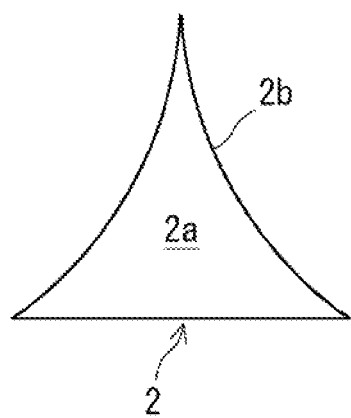
FIG. 16 shows a different reflection part of a mirror.

Although the reflection part is formed in a conical shape in the above-described example embodiments, its shape is not limited to the conical shape. For example, the reflection part 2b may be formed as a projecting curved surface as shown in FIG. 15, or the reflection part 2b may be formed as a recessed curved surface as shown in FIG. 16. Further, the shape of the reflection part is not limited to the conical shape, and may be a polygonal pyramid shape. To put it briefly, the reflection part may have any shape as long as it can guide images of a plurality of objects to be inspected to the imaging unit. Therefore, for example, the reflection part may have a discontinuous part in the circumferential direction.

Note that the reflection part may have a shape by which images of objects to be inspected which may have a plurality of types of shapes can be guided to the imaging unit. For example, the reflection part has such a shape that images of objects to be inspected in which their lower parts are enlarged can be guided to the imaging unit by a part of the refection part in the circumferential direction thereof, and images of the objects to be inspected in which their upper parts are enlarged can be guided to the imaging unit by another part of the refection part. In this way, it is possible to accurately detect not only a foreign substance present on one of the upper and lower sides of an object to be inspected but also a foreign substance present on the other side of the object to be inspected while the object to be inspected makes one revolution by the conveyance unit 6.

Note that, for example, image information of an object to be inspected is preferably acquired in advance as a sample through the reflection part, and calibration is preferably performed based on the acquired image information so that a distortion(s) in image information that occurs when an object to be inspected is product-inspected is eliminated.

Figure 17:
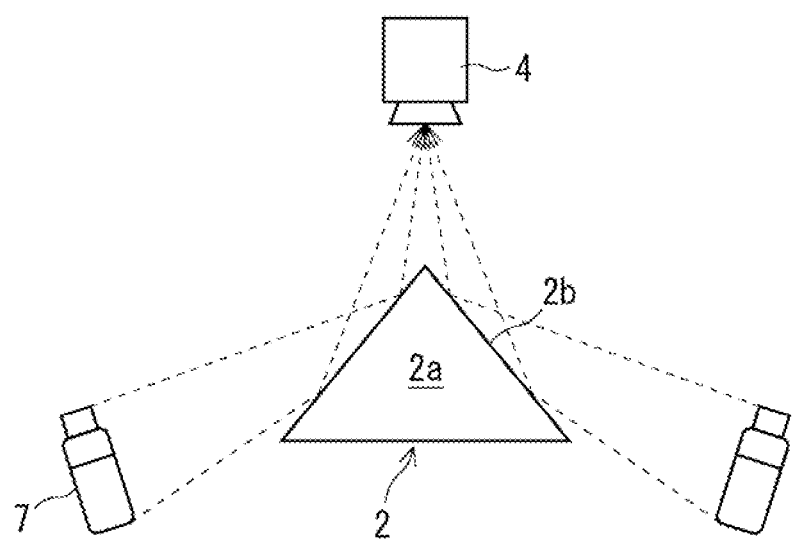
FIG. 17 is a diagram for explaining a positional relation among an object to be inspected, a mirror, and an imaging unit in a product-inspection apparatus according to another example embodiment.
Figure 18:
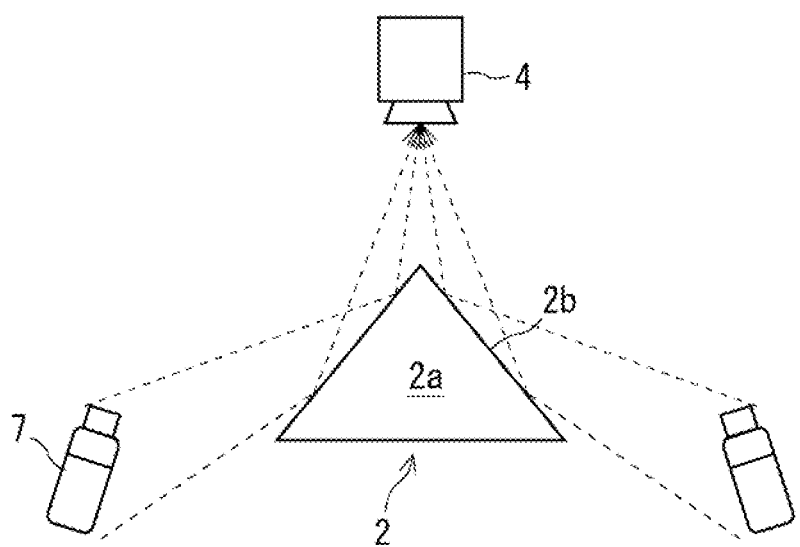
FIG. 18 is a diagram for explaining a positional relation among an object to be inspected, a mirror, and an imaging unit in a product-inspection apparatus according to another example embodiment.

Although the object to be inspected 7 is product-inspected in a standing position in the above-described example embodiment, the object to be inspected 7 may be inspected in an inclined position as shown in FIGS. 17 and 18.

Although the object to be inspected is not vibrated while being made to rotate on its own axis at the same time in the above-described example embodiment, the object to be inspected may be vibrated while being made to rotate on its own axis at the same time. That is, there are no restrictions on how to move a plurality of objects to be inspected during the photographing process as long as the objects to be inspected are photographed through the mirror. For example, the objects to be inspected may be moved based on an ordinary foreign-substance detection method. Further, acquired image information may also be processed based on an ordinary foreign-substance detection method.

Although each of the product-inspection apparatuses according the above-described example embodiments is configured to include only one imaging unit, it may include a plurality of imaging units as long as one imaging unit can photograph a plurality of objects to be inspected. Further, regarding the light source, an ordinary light source can be used, and a laser light source may be used.

The whole or part of the example embodiments disclosed above can be described as, but not limited to, the following supplementary notes.

(Supplementary Note 1)

A product-inspection apparatus comprising:
- a mirror comprising a first reflection part disposed on a side surface of a first projecting part having a tapered shape;
- a first imaging unit configured to take images of a plurality of objects to be inspected arranged around the first reflection part through the first reflection part;
- a light source configured to apply light to the objects to be inspected; and
- a determination unit configured to determine whether or not the object to be inspected is a quality product based on image information taken by the first imaging unit.

(Supplementary Note 2)

The product-inspection apparatus described in Supplementary note 1, wherein
when a gravity-direction side is defined as a lower side, the first imaging unit is disposed above the mirror, and the first projecting part has an upwardly-tapered shape, and the first reflection part guides images of the plurality of objects to be inspected to the first imaging unit.

(Supplementary Note 3)

The product-inspection apparatus described in Supplementary note 1, wherein
when a gravity-direction side is defined as a lower side, the first imaging unit is disposed below the mirror, and the first projecting part has a downwardly-tapered shape, and the first reflection part guides images of the plurality of objects to be inspected to the first imaging unit.

(Supplementary Note 4)

The product-inspection apparatus described in Supplementary note 1, further comprising, when a gravity-direction side is defined as a lower side, a second imaging unit disposed below the mirror in addition to the first imaging unit disposed above the mirror, wherein
the mirror comprises the first reflection part disposed on a side surface of the first projecting part having the upwardly-tapered shape and configured to guide images of the plurality of objects to be inspected to the first imaging unit, and a second reflection part disposed on a side surface of the second projecting part having the downwardly-tapered shape and configured to guide the images of the plurality of objects to be inspected to the second imaging unit.

(Supplementary Note 5)

The product-inspection apparatus described in any one of Supplementary notes 1 to 4, further comprising a conveyance unit configured to convey, when a gravity-direction side is defined as a lower side, the plurality of objects to be inspected around the mirror as viewed in an up/down direction.

(Supplementary Note 6)

The product-inspection apparatus described in any one of Supplementary notes 1 to 5, further comprising a rotation unit configured to make, when a gravity-direction side is defined as a lower side, the object to be inspected rotate on its own axis which coincides with a rotation axis extending in an up/down direction.

(Supplementary Note 7)

The product-inspection apparatus described in any one of Supplementary notes 1 to 6, further comprising a vibration unit configured to vibrate the object to be inspected.

(Supplementary Note 8)

The product-inspection apparatus described in any one of Supplementary notes 1 to 7, further comprising an antireflection part configured to prevent light emitted from the mirror from being reflected in an external environment.

(Supplementary Note 9)

The product-inspection apparatus described in any one of Supplementary notes 1 to 8, further comprising a first wavelength changing unit disposed between the mirror and the first imaging unit, the first wavelength changing unit being configured to change a wavelength characteristic of light emitted from the mirror.

(Supplementary Note 10)

The product-inspection apparatus described in Supplementary note 4, further comprising a second wavelength changing unit disposed between the mirror and the second imaging unit, the second wavelength changing unit being configured to change a wavelength characteristic of light emitted from the mirror.

(Supplementary Note 11)

The product-inspection apparatus described in any one of Supplementary notes 1 to 10, further comprising a polarization unit configured to polarize light emitted from the light source.

(Supplementary Note 12)

A product-inspection method comprising:
- applying light to a plurality of objects to be inspected arranged around a mirror comprising a first reflection part disposed on a side surface of a first projecting part having a tapered shape;
- taking images of the plurality of objects to be inspected through the first reflection part; and
- determining whether or not the object to be inspected is a quality product based on taken image information.

(Supplementary Note 13)

The product-inspection method described in Supplementary note 12, wherein when a gravity-direction side is defined as a lower side, lower parts of the plurality of objects to be inspected are photographed in an enlarged manner through the first reflection part disposed on a side surface of the first projecting part having an upwardly-tapered shape.

(Supplementary Note 14)

The product-inspection method described in Supplementary note 12, wherein when a gravity-direction side is defined as a lower side, upper parts of the plurality of objects to be inspected are photographed in an enlarged manner through the first reflection part disposed on a side surface of the first projecting part having a downwardly-tapered shape.

(Supplementary Note 15)

The product-inspection method described in Supplementary note 12, wherein when a gravity-direction side is defined as a lower side, upper parts of the plurality of objects to be inspected are photographed through the first reflection part disposed on a side surface of the first projecting part having an upwardly-tapered shape, and lower parts of the plurality of objects to be inspected are photographed through the second reflection part disposed on a side surface of the second projecting part having a downwardly-tapered shape in the mirror.

(Supplementary Note 16)

The product-inspection method described in any one of Supplementary notes 12 to 15, wherein when a gravity-direction side is defined as a lower side, the plurality of objects to be inspected are photographed while being conveyed around the mirror as viewed in an up/down direction.

(Supplementary Note 17)

The product-inspection method described in any one of Supplementary notes 12 to 16, wherein when a gravity-direction side is defined as a lower side, the objects to be inspected are photographed while being made to rotate on its own axis which coincides with a rotation axis extending in an up/down direction.

(Supplementary Note 18)

The product-inspection method described in any one of Supplementary notes 12 to 17, wherein the objects to be inspected are photographed while being vibrated.

(Supplementary Note 19)

The product-inspection method described in any one of Supplementary notes 12 to 18, wherein images of the objects to be inspected that appear as a wavelength characteristic of light emitted from the mirror is changed is taken.

(Supplementary Note 20)

The product-inspection method described in any one of Supplementary notes 12 to 19, wherein images of the objects to be inspected that appear as a wavelength characteristic of light emitted from the light source is polarized is taken.

(Supplementary Note 21)

A non-transitory computer readable medium storing a program for causing a computer to:
- apply light to a plurality of objects to be inspected arranged around a mirror comprising a first reflection part disposed on a side surface of a first projecting part having a tapered shape;
- take images of the plurality of objects to be inspected through the first reflection part; and
- determine whether or not the object to be inspected is a quality product based on acquired image information.

REFERENCE SIGNS LIST

1 PRODUCT-INSPECTION APPARATUS
2 MIRROR
2a PROJECTING PART
2b REFLECTION PART
3 LIGHT SOURCE
4 IMAGING UNIT
5 DETERMINATION UNIT
10 CONVEYANCE PATH
6 CONVEYANCE UNIT
8 PRODUCT SUPPLY UNIT
9 PRODUCT OUTPUT UNIT
7 OBJECT TO BE INSPECTED
7a CONTAINER
7b FLUID
7c PLUG
11 ROTATION UNIT
12 ANTIREFLECTION PART
12a THROUGH-HOLE
13 PROCESSING UNIT
14 CONTROL UNIT
21 PRODUCT-INSPECTION APPARATUS
22 MIRROR
22a PROJECTING PART
22b REFLECTION PART
23 IMAGING UNIT
24 LIGHT SOURCE
25 OBJECT TO BE INSPECTED
25a CONTAINER
25b POWDER
25c PLUG
31 PRODUCT-INSPECTION APPARATUS
32 MIRROR
32a FIRST PROJECTING PART
32c FIRST REFLECTION PART
32b SECOND PROJECTING PART
32d SECOND REFLECTION PART
33 FIRST IMAGING UNIT
34 SECOND IMAGING UNIT
35 OBJECT TO BE INSPECTED
36 LIGHT SOURCE
41 PRODUCT-INSPECTION APPARATUS
42 CONVEYANCE UNIT
43 LIGHT SOURCE
44 MIRROR
44a PROJECTING PART
44b REFLECTION PART
44c REFLECTION SURFACE
45 VIBRATION UNIT
51 PRODUCT-INSPECTION APPARATUS
52 FIRST WAVELENGTH CHANGING UNIT
53 SECOND WAVELENGTH CHANGING UNIT
61 PRODUCT-INSPECTION APPARATUS
62 POLARIZATION UNIT
62a FIRST POLARIZING PLATE
62b SECOND POLARIZING PLATE
130 APPARATUS
131 INTERFACE
132 PROCESSOR
133 MEMORY

What is claimed is:

1. A product-inspection apparatus comprising:
   a mirror comprising a first reflection part disposed on a side surface of a first projecting part having a tapered conical shape;
   a first image sensor configured to take images of a plurality of objects to be inspected arranged around the first reflection part through the first reflection part, and acquire an image in which the plurality of objects to be inspected are radially arranged;

a light source configured to apply light to the objects to be inspected;

a determination unit comprising at least one processor configured to determine whether or not the object to be inspected is a quality product based on image information taken by the first image sensor; and when a gravity-direction side is defined as a lower side, a second image sensor disposed below the mirror in addition to the first image sensor disposed above the mirror, wherein the mirror comprises the first reflection part disposed on a side surface of the first projecting part having the upwardly-tapered conical shape and configured to guide images of the plurality of objects to be inspected to the first image sensor, and a second reflection part disposed on a side surface of the second projecting part having the downwardly-tapered conical shape and configured to guide the images of the plurality of objects to be inspected to the second image sensor.

2. A product-inspection method comprising:

applying light to a plurality of objects to be inspected arranged around a mirror comprising a first reflection part disposed on a side surface of a first projecting part having a tapered conical shape;

taking images of the plurality of objects to be inspected through the first reflection part, and acquiring an image in which the plurality of objects to be inspected are radially arranged; and determining whether or not the object to be inspected is a quality product based on taken image information, wherein when a gravity-direction side is defined as a lower side, lower parts of the plurality of objects to be inspected are photographed in an enlarged manner through the first reflection part disposed on a side surface of the first projecting part having an upwardly-tapered conical shape.

* * * * *